Patented Nov. 8, 1932

1,886,414

UNITED STATES PATENT OFFICE

ADOLF MEYER, OF KUSNACHT, NEAR ZURICH, SWITZERLAND, ASSIGNOR TO AKTIEN-GESELLSCHAFT BROWN, BOVERI AND CIE., OF BADEN, SWITZERLAND

DEVICE FOR FIXING DISKS TO A SHAFT

Application filed June 2, 1928, Serial No. 284,234, and in Germany June 20, 1927.

Disks which are mounted on a shaft extending through the hub and which are exposed to great centrifugal stresses and at the same time to high temperatures frequently become loose after running for a short period, the bore in the wheel expanding under the influence of the centrifugal forces and heat to a greater extent than the shaft which usually remains much colder than the hub embracing it. If an attempt be made by shrinking the disk on the shaft to equalize the influence of the centrifugal forces and in addition to this the influence of the differences in temperature, inadmissibly high shrinkage strains will soon be reached, where the disks to be shrunk on are for instance the rotor wheels of steam turbines for very high superheating or of gas or exhaust gas turbines.

The present invention relates to a different method of fixing the disks, which overcomes this difficulty. It consists in this that not only, as hitherto, the shaft is embraced by the hub but that in addition thereto the hub is also embraced by the shaft. According to the present invention a recess and a projection on the shaft is caused to engage a corresponding projection and recess on the hub.

By this means the stresses due to centrifugal force are transmitted by the disk to the shaft, so that a loosening of the disks under the influence of the centrifugal forces acting on the hub is prevented. The expansions due to heat also have no detrimental effect on the firmness of the method of mounting according to the invention, as the connection of the disk and the shaft is strengthened by such expansion.

Figure 1:
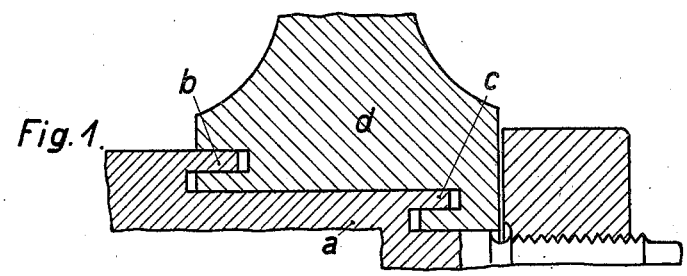
Figure 1 shows the device with two parallel projections on the shaft and two corresponding recesses on the hub.
Figure 2:
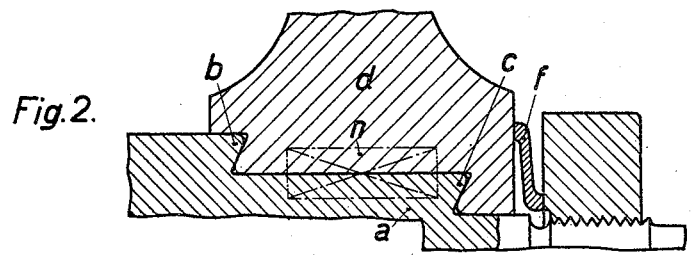
Figure 2 shows the device with conical projections on the shaft.
Figure 3:
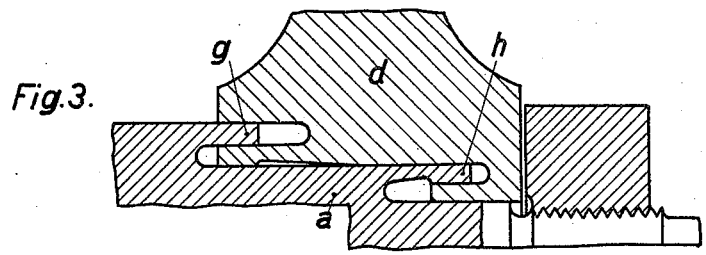
Figure 3 shows resilient projections.
Figure 4:
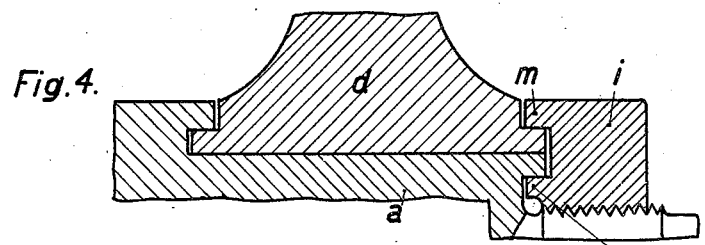
Figures 4 and 5 show means for pressing the hub and shaft into engagement.
Figure 5:
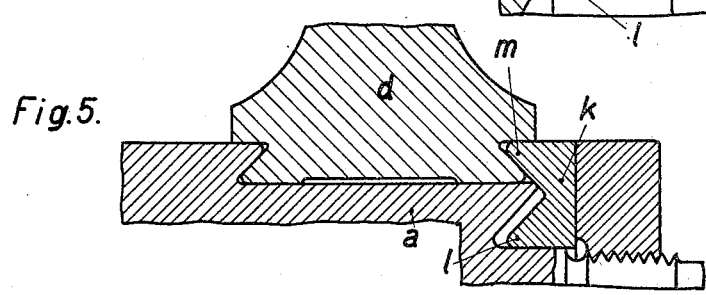

Figs. 1 to 3 of the accompanying drawing show several constructional examples for carrying out the invention.

In Figs. 1 and 2 the shaft $a$ has for instance two projections $b$ and $c$ which engage in corresponding recesses in the hub $d$ of a rotor wheel disk.

In Fig. 2 the projections $b$ and $c$ are of conical shape. This figure also shows at $f$ a spring washer which equalizes in the axial direction the pressure acting against the conical surfaces, even when the shaft and the hub expand to a different extent.

In Fig. 3 the recesses in the hub and in the shaft are so formed that they allow a certain amount of resilience for instance at $g$ and $h$. The pressure exerted by the hub on the shaft, instead of depending on the whole hub being shrunk on, can be effected in this instance by a slight deformation of the resilient part.

For ensuring the disk against turning, keys $n$ are inserted in the hub in the usual manner, as shown in Fig. 2.

What I claim is:

1. A device for fixing the rotor disks of high temperature gas turbines upon their shafts which includes a plurality of axially directed annular recesses and projections on the shaft, a corresponding plurality of annular projections and recesses on the hub of the rotor disk, the said projections being of a resilient nature, and means for forcing the said recesses and projections into mutual engagement and maintaining them in the engaged position.

2. A device as claimed in claim 1 wherein the means for forcing into and maintaining in engagement the shaft and rotor comprise a nut adapted to traverse a threaded portion of the shaft and a key for preventing relative rotary motion of the hub upon the shaft.

Dated this 9th day of May, 1928.

In testimony whereof I have signed my name to this specification.

ADOLF MEYER.